(12) United States Patent  (10) Patent No.: US 9,153,108 B2
Kiefer et al.  (45) Date of Patent: Oct. 6, 2015

(54) ALERT SYSTEMS AND METHODS FOR A VEHICLE

(71) Applicant: GM GLOBAL TECHNOLOGY OPERATIONS LLC, Detroit, MI (US)

(72) Inventors: Raymond J. Kiefer, Huntington Woods, MI (US); Alexander N. Ballios, Troy, MI (US); Charles A. Green, Canton, MI (US); Mark A. Stebbins, Bloomfield Hills, MI (US); Diane K. McQueen, Leonard, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 167 days.

(21) Appl. No.: 13/894,322

(22) Filed: May 14, 2013

(65) Prior Publication Data

US 2013/0342330 A1 Dec. 26, 2013

Related U.S. Application Data

(60) Provisional application No. 61/663,516, filed on Jun. 22, 2012.

(51) Int. Cl.
*G08B 6/00* (2006.01)
*B60N 2/44* (2006.01)

(52) U.S. Cl.
CPC .. *G08B 6/00* (2013.01); *B60N 2/44* (2013.01); *B60N 2002/4485* (2013.01)

(58) Field of Classification Search
CPC ........................................................ G08B 6/00
USPC ...................... 340/407.1, 575, 576, 903, 435; 297/217.1, 217.3
See application file for complete search history.

(56) References Cited

U.S. PATENT DOCUMENTS

| 5,432,509 A | 7/1995 | Kajiwara |
| 5,890,083 A | 3/1999 | Franke et al. |

(Continued)

FOREIGN PATENT DOCUMENTS

| CN | 101342874 A | 1/2009 |
| CN | 101678819 A | 3/2010 |

(Continued)

OTHER PUBLICATIONS

U.S. Appl. No. 13/894,279, dated May 14, 2013.

(Continued)

*Primary Examiner* — Brent Swarthout
(74) *Attorney, Agent, or Firm* — Ingrassia Fisher & Lorenz, P.C.

(57) ABSTRACT

Methods and vehicles are provided for providing haptic feedback to a vehicle occupant. In one embodiment, the method includes selecting a pattern of active haptic periods during which a controller will command a plurality of haptic actuators disposed in a seat of a vehicle to generate haptic pulses, determining a desired voltage of a signal supplied to the haptic actuators that indicates the active haptic periods to generate a desired intensity of haptic pulses, determining an actual voltage of an energy storage device of the vehicle, calculating a pulse width modulation (PWM) pattern that simulates the desired voltage when applied to the signal using the actual voltage, and generating a signal that indicates the active haptic periods based on the PWM pattern to command the haptic actuators to generate the desired intensity of haptic pulses.

20 Claims, 6 Drawing Sheets

(56) References Cited

U.S. PATENT DOCUMENTS

| | | | |
|---|---|---|---|
| 6,127,944 | A | 10/2000 | Daly et al. |
| 6,289,332 | B2 | 9/2001 | Menig et al. |
| 6,345,179 | B1 | 2/2002 | Wiegers et al. |
| 6,744,370 | B1 | 6/2004 | Sleichter, III et al. |
| 6,834,232 | B1 | 12/2004 | Malhotra |
| 7,170,400 | B2 | 1/2007 | Cowelchuk et al. |
| 7,245,231 | B2 | 7/2007 | Kiefer et al. |
| 7,369,042 | B2 | 5/2008 | Osaka et al. |
| 7,391,305 | B2 | 6/2008 | Knoll et al. |
| 7,515,066 | B2 | 4/2009 | Watanabe |
| 7,619,505 | B2 | 11/2009 | Kim |
| 8,013,720 | B2 | 9/2011 | Oelrich et al. |
| 8,305,200 | B2 * | 11/2012 | Murphy et al. ............ 340/407.1 |
| 8,339,285 | B2 | 12/2012 | Boren et al. |
| 8,593,301 | B2 | 11/2013 | Newman |
| 8,669,857 | B2 | 3/2014 | Sun et al. |
| 2003/0229447 | A1 | 12/2003 | Wheatley et al. |
| 2004/0049232 | A1 | 3/2004 | Ideker et al. |
| 2004/0049323 | A1 * | 3/2004 | Tijerina et al. ................... 701/1 |
| 2004/0252027 | A1 | 12/2004 | Torkkola et al. |
| 2005/0043864 | A1 | 2/2005 | Echtenkamp |
| 2005/0125153 | A1 | 6/2005 | Matsumoto et al. |
| 2006/0255920 | A1 | 11/2006 | Maeda et al. |
| 2007/0109104 | A1 | 5/2007 | Altan et al. |
| 2008/0042813 | A1 | 2/2008 | Wheatley et al. |
| 2008/0174415 | A1 | 7/2008 | Tanida et al. |
| 2008/0197901 | A1 * | 8/2008 | Cruz-Hernandez et al. .. 327/175 |
| 2008/0201039 | A1 | 8/2008 | Matsuoka et al. |
| 2009/0015045 | A1 | 1/2009 | Nathan et al. |
| 2009/0079690 | A1 | 3/2009 | Watson et al. |
| 2009/0232320 | A1 | 9/2009 | Azizi et al. |
| 2010/0114467 | A1 | 5/2010 | Samuel et al. |
| 2010/0201508 | A1 | 8/2010 | Green et al. |
| 2010/0274438 | A1 | 10/2010 | Egami |
| 2011/0001616 | A1 * | 1/2011 | Nathan et al. ................. 340/438 |
| 2011/0066325 | A1 | 3/2011 | Lu et al. |
| 2011/0169626 | A1 | 7/2011 | Sun et al. |
| 2011/0316686 | A1 | 12/2011 | Matsuno et al. |
| 2012/0081234 | A1 | 4/2012 | Shaffer et al. |
| 2012/0154156 | A1 | 6/2012 | Kuntzel |
| 2012/0212353 | A1 | 8/2012 | Fung et al. |
| 2012/0269358 | A1 | 10/2012 | Gee et al. |
| 2012/0283939 | A1 | 11/2012 | Bobbitt, III |
| 2013/0009789 | A1 | 1/2013 | Ichikawa |
| 2013/0325313 | A1 | 12/2013 | Kim et al. |

FOREIGN PATENT DOCUMENTS

| | | |
|---|---|---|
| CN | 101728942 A | 6/2010 |
| CN | 101968910 A | 2/2011 |
| CN | 101973210 A | 2/2011 |
| CN | 201749540 U | 2/2011 |
| CN | 201932077 U | 8/2011 |
| CN | 202071799 U | 12/2011 |
| GB | 2414304 A | 11/2005 |
| JP | 2012006518 A | 1/2012 |
| WO | 2009134525 A1 | 11/2009 |
| WO | 2011062869 A1 | 5/2011 |

OTHER PUBLICATIONS

U.S. Appl. No. 13/894,283, dated May 14, 2013.
U.S. Appl. No. 13/894,317, dated May 14, 2013.
U.S. Appl. No. 13/894,345, dated May 14, 2013.
U.S. Appl. No. 13/894,347, dated May 14, 2013.
U.S. Appl. No. 13/894,290, dated May 14, 2013.
U.S. Appl. No. 13/894,294, dated May 14, 2013.
U.S. Appl. No. 13/894,297, dated May 14, 2013.
U.S. Appl. No. 13/894,302, dated May 14, 2013.
U.S. Appl. No. 13/894,307, dated May 14, 2013.
U.S. Appl. No. 13/894,308, dated May 14, 2013.
USPTO, Office Action for U.S. Appl. No. 13/894,347, mailed Oct. 21, 2014.
USPTO, Office Action for U.S. Appl. No. 13/894,308, mailed Dec. 3, 2014.
USPTO, Office Action for U.S. Appl. No. 13/894,290, mailed Nov. 24, 2014.
USPTO, Notice of Allowance for U.S. Appl. No. 13/894,297, mailed Oct. 7, 2014.
USPTO, Final Office Action for U.S. Appl. No. 13/894,347 mailed Feb. 5, 2015.
USPTO, Final Office Action for U.S. Appl. No. 13/894,308 mailed Mar. 17, 2015.
USPTO, Final Office Action for U.S. Appl. No. 13/894,302 mailed Mar. 18, 2015.
USPTO, Final Office Action for U.S. Appl. No. 13/894,290 mailed Mar. 25, 2015.
USPTO, Notice of Allowance and Fee(s) Due for U.S. Appl. No. 13/894,317 mailed Apr. 1, 2015.
State Intellectual Property Office of the People's Republic of China, Office Action in Chinese Patent Application No. 201310343668.1 mailed Apr. 8, 2015.
USPTO, Office Action for U.S. Appl. No. 13/894,307 mailed Apr. 17, 2015.
USPTO, Notice of Allowance and Fee(s) Due for U.S. Appl. No. 13/894,294 mailed May 11, 2015.
USPTO, Office Action for U.S. Appl. No. 13/894,317 mailed Dec. 10, 2014.
USPTO, Office Action for U.S. Appl. No. 13/894,302 mailed Dec. 10, 2014.
USPTO, Office Action for U.S. Appl. No. 13/894,294, mailed Jan. 2, 2015.
State Intellectual Property Office of the People'S Republic of China, Office Action in Chinese Patent Application No. 201310498497.X mailed Apr. 13, 2015.
State Intellectual Property Office of the People'S Republic of China, Office Action in Chinese Patent Application No. 201310248857.0 mailed May 6, 2015.
State Intellectual Property Office of the People'S Republic of China, Office Action in Chinese Patent Application No. 201310249780.9 mailed Jun. 3, 2015.
State Intellectual Property Office of the People'S Republic of China, Office Action in Chinese Patent Application No. 201310249842.6 mailed Jun. 18, 2015.
USPTO, Office Action for U.S. Appl. No. 13/894,345 mailed Jun. 29, 2015.

* cited by examiner

ALERT SYSTEMS AND METHODS FOR A VEHICLE

CROSS REFERENCE TO RELATED APPLICATIONS

This application claims the benefit of U.S. Provisional Application No. 61/663,516 filed Jun. 22, 2012 and hereby incorporated by reference.

TECHNICAL FIELD

The technical field generally relates to driver alert systems and methods, and more particularly relates to control systems and methods for haptic devices associated with a vehicle seat assembly.

BACKGROUND

Collision avoidance systems warn drivers of potential collision threats that may be in the line-of-sight of the driver (e.g., detected by on-board vehicle sensors) or out of the line-of-sight of the driver (e.g., determined from wireless vehicle-to-vehicle communications, vehicle-to-infrastructure communications, and/or vehicle-to-pedestrian communications). Collision avoidance systems may generate visual and/or auditory alerts to warn a vehicle driver of the potential collision threats. These typical collision avoidance systems for alerting the driver to a condition that needs attention may be distracting and confusing. Such distraction and confusion might have the potential to increase driver response time and decrease effectiveness of the collision avoidance system.

Accordingly, it is desirable to provide methods and systems for alerting a driver of the vehicle using a haptic device, particularly improved methods and systems that generate more effective haptic alerts. Other desirable features and characteristics of the present invention will become apparent from the subsequent detailed description and the appended claims, taken in conjunction with the accompanying drawings and the foregoing technical field and background.

SUMMARY

A method is provided for alerting an occupant of a vehicle. In one embodiment, the method includes selecting a pattern of active haptic periods during which a controller will command a plurality of haptic actuators disposed in a seat of a vehicle to generate haptic pulses, determining a desired voltage of a signal supplied to the haptic actuators that indicates the active haptic periods to generate a desired intensity of haptic pulses, determining an actual voltage of an energy storage device of the vehicle, calculating a pulse width modulation (PWM) pattern that simulates the desired voltage when applied to the signal using the actual voltage, and generating a signal that indicates the active haptic periods based on the PWM pattern to command the haptic actuators to generate the desired intensity of haptic pulses.

A method is provided for alerting an occupant of a vehicle. In one embodiment, the method includes selecting a pattern of active haptic periods during which a controller will command a plurality of haptic actuators disposed in a seat of a vehicle to generate haptic pulses, determining a desired intensity of haptic pulses based on a vibration intensity perceived by drivers larger than the smallest 5% of potential drivers and smaller than the largest 5% of potential drivers, determining a desired voltage of a signal supplied to the haptic actuators that indicates the active haptic periods to achieve the desired intensity of haptic pulses, determining an actual voltage of an energy storage device of the vehicle, calculating a pulse width modulation (PWM) pattern that simulates the desired voltage when applied to the signal using the actual voltage, and generating a signal that indicates the active haptic periods based on the PWM pattern to command the haptic actuators to generate the desired intensity of haptic pulses.

A vehicle is provided for providing haptic feedback to a driver. In one embodiment, the vehicle includes a seat for supporting the driver, a plurality of haptic actuators disposed in the seat, and a controller in communication with the haptic actuators. The controller selects a pattern of active haptic periods during which the controller will command the plurality of haptic actuators to generate haptic pulses, determines a desired voltage of a signal to supply to the haptic actuators and that indicates the active haptic periods to achieve a desired intensity of haptic pulses, determines an actual voltage of an energy storage device of the vehicle, calculates a pulse width modulation (PWM) pattern that simulates the desired voltage when applied to the actual voltage, and generates the signal that indicates the active haptic periods based on the PWM pattern to command the haptic actuators to generate the desired intensity of haptic pulses.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
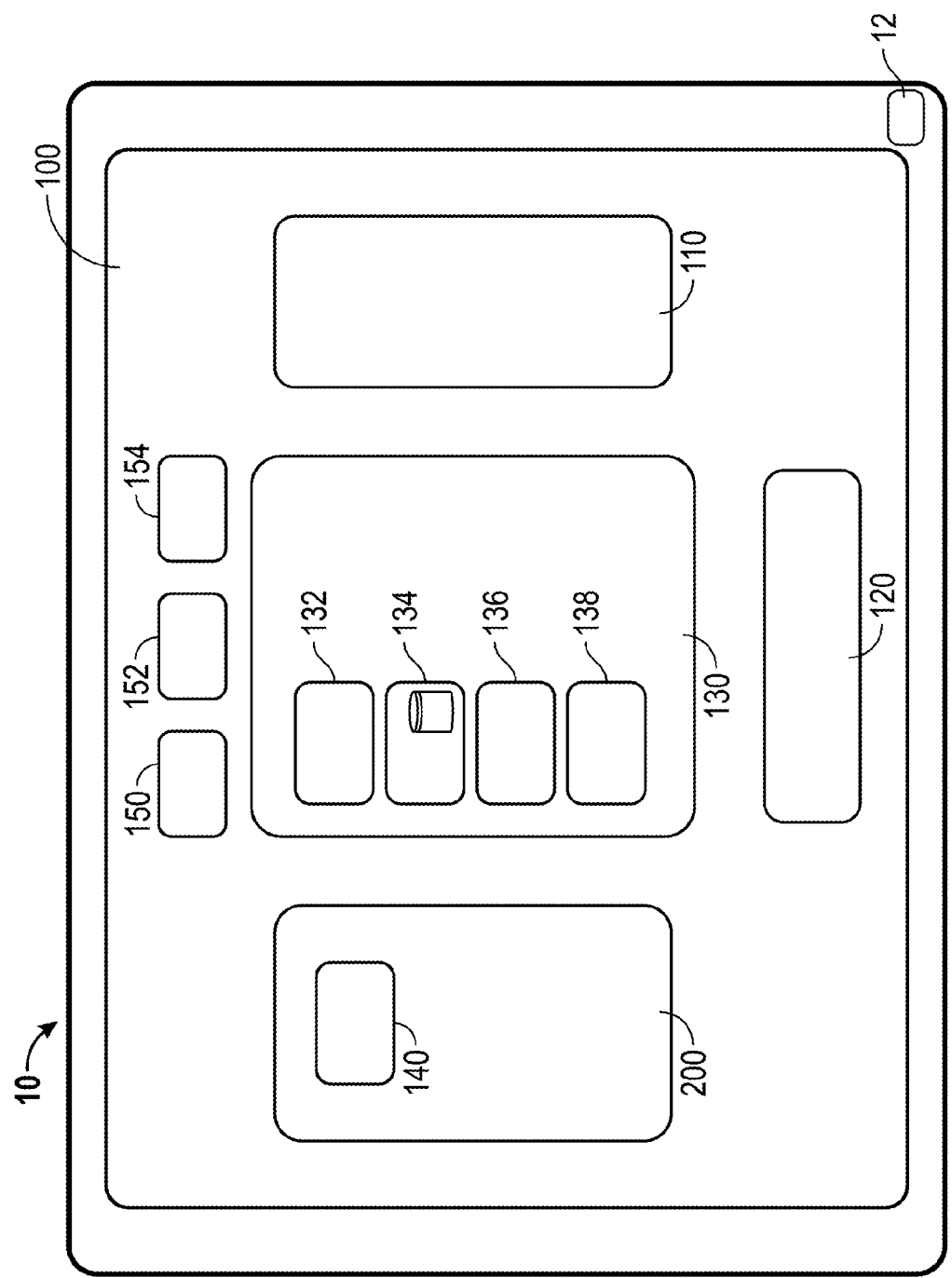
FIG. 1 is a functional block diagram illustrating a vehicle that includes a driver alert system in accordance with exemplary embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Broadly, exemplary embodiments discussed herein refer to driver alert systems and methods implemented as a vehicle seat assembly. The driver alert systems and methods may include actuators incorporated into seat bolsters that provide improved haptic responses and more efficient installation.

FIG. 1 is a functional block diagram illustrating a vehicle 10 that includes a driver alert system 100 in accordance with exemplary embodiments. Although not shown, the vehicle has a generally known configuration with one or more seats for supporting a driver and a battery 12 for supplying a voltage to components of the vehicle 10.

Additional details about a vehicle seat assembly 200 will be provided below after a brief description of the driver alert system 100.

In general, the driver alert system 100 includes one or more collision avoidance modules 110, a communications module 120, a control module 130, a haptic alert assembly (or haptic feedback assembly) 140, and one or more additional alert devices, including a visual alert device 150, an auditory alert device 152, and an infotainment alert device 154. As introduced above and as described in greater detail below, the haptic alert assembly 140 may be incorporated into the vehicle seat assembly 200, which may also be considered part of the driver alert system 100. During operation and as also discussed in greater detail below, the control module 130 receives input signals from the collision avoidance modules 110 and communications module 120 that indicate the possibility of a collision condition. The control module 130 evaluates the input signals, and as appropriate, operates the haptic alert assembly 140 and/or alert devices 150, 152, 154 to alert the driver of the collision condition. As such, the driver alert system 100 may function to alert the driver of a collision condition such that crash avoidance maneuvers (e.g., braking and/or steering) and/or crash mitigation responses (e.g., braking and/or steering) may be initiated. Although the figures shown herein depict example arrangements of elements, additional intervening elements, devices, features, or components may be present in some embodiments.

In general, the collision avoidance modules 110 include one or more on-board vehicle sensors (e.g., camera, radar, and/or lidar) that detect a potential for a collision information based on the vehicle sensor signals. The collision avoidance modules 110 may generally be implemented as, for example, forward collision warning systems, lane departure warning or lane keeping assist systems, front park assist systems, rear park assist systems, front and rear automatic braking systems, rear cross traffic alert systems, adaptive cruise control (ACC) systems, side blind zone (or spot) detection systems, lane change alert systems, driver attention systems (e.g., distraction- and/or drowsiness-monitoring), and front pedestrian detection systems and rear pedestrian detection systems. As noted above, the driver alert system 100 may further include communications module 120 to enable communications between vehicles, between the vehicle and an infrastructure, and/or between the vehicle and pedestrians/cyclists to forecast potential collisions due to traffic, pedestrian, bicycles, or activity either inside the line-of-sight of the driver or outside of the line-of-sight of the driver (e.g., a road hazard or traffic jam ahead is detected beyond the driver's line-of-sight). In general, the collision avoidance modules 110 and/or communications module 120 are communicatively coupled to a control module 130 that evaluates a potential for a collision based on the vehicle sensor signals and/or communications.

The control module 130 includes one or more submodules or units 132, 134, 136, and 138 that cooperate to evaluate the signals from the collision avoidance modules 110 and communications module 120, and in response, generate a control signal for operating one or more of the haptic alert assembly 140 and/or the devices 150, 152, 154. As described below, the control module 130 may include a monitoring unit 132, a user configuration unit 134, an evaluation unit 136, and a pattern determination unit 138. As can be appreciated, the units shown in FIG. 1 may be integrated with other control modules or may be implemented separately for each collision avoidance system. The control module may also be a plug-in device that is installed into the onboard diagnostics connector of the vehicle (OBD-II), a retrofit module that is collocated with an existing vehicle module (i.e., installed at the host module using an adaptation connector), or as a replacement part for an existing vehicle system (i.e., inside rear-view mirror assembly). The control module may also be a wireless device that is communicatively coupled to the vehicle over a short range wireless connection such as Wi-Fi, Bluetooth, NFC or similar.

In general, the monitoring unit 132 monitors input from various components of the vehicle 10, particularly the haptic alert assembly 140 to determine proper operation. If the monitoring unit 132 determines that a component is malfunctioning, the monitoring unit 132 may generate a warning message, a warning signal, and/or a faulty condition status that may be communicated to the vehicle driver or technician.

The user configuration unit 134 manages the display of a configuration menu and manages user input received from a user interacting with the configuration menu. Such a configuration menu may be displayed on a display device within the vehicle or remote from the vehicle. In various embodiments, the configuration menu includes selectable options that, when selected, allow a user to configure the various alert settings associated with the devices 150, 152, 154 and/or haptic alert assembly 140. The alert settings for the haptic alert assembly 140 may include, but are not limited to, an occurrence of the vibration (e.g., whether or not to perform the vibration for a particular mode), a location of the vibration on the seat, an intensity of the vibration, a duration of the vibration, a rate of the vibration, and/or a frequency of the pulses of the vibration. Based on the user input received from the user interacting with the configuration menu, the user configuration unit 134 stores the user configured alert settings in an alert settings database. As can be appreciated, the alert settings database may include volatile memory that temporarily stores the settings, non-volatile memory that stores the settings across key cycles, or a combination of volatile and non-volatile memory.

The evaluation unit 136 functions to ascertain the current mode of the vehicle 10 and to evaluate, based on that mode, the condition input signals and communications from the collision avoidance modules 110 and communications module 120. Based on this evaluation, the evaluation unit 136 may determine that a collision condition exists, e.g., that the vehicle may have the potential to be in a collision. Upon declaring a collision condition, the evaluation unit 136 sends an appropriate signal to the pattern determination unit 138. The signal may also indicate the nature of the collision condition.

Upon indication of the collision condition, the pattern determination unit 138 generates a control signal to operate one or more of the devices 150, 152, 154 and/or haptic alert assembly 140. In one exemplary embodiment, the control signal may define one or more alert patterns based on the collision condition. The alert patterns include haptic alert patterns, visual alert patterns, and/or auditory alert patterns. In various embodiments, the pattern determination unit 138 determines the alert patterns by retrieving the predefined alert settings and/or the user defined alert settings from the alert setting database based on the collision condition. Additional details about the alert patterns are discussed below.

The alert pattern may also indicate a synchronization of multiple aspects of the devices 150, 152, 154 and haptic alert assembly 140. For example, the haptic alert assembly 140 may include multiple haptic actuators, such as right and left actuators as discussed below. As such, the alert pattern may include directional commands, such as the operation of the right or left actuator to provide additional information about the nature of the collision condition (e.g., location of the crash threat).

Any suitable visual alert device 150 and auditory alert device 152 may be provided. As example, the visual alert device 150 may be implemented as a light within the interior of the vehicle 10 and the auditory alert device 152 may be implemented as part of the vehicle stereo system. The infotainment alert device 154 may correspond to a device or combination of devices for interacting with the vehicle 10. For example, the infotainment alert device 154 may include a display screen integrated in the dashboard and user interfaces, such as a touch screen, buttons, and/or rotary dials. The alert signals associated with the infotainment alert device 154 may take the form of visual, audible, and/or haptic alert signals (e.g., touch screen haptic pulses felt by the finger when pressing an area of the touch screen).

The haptic alert assembly 140 may be any suitable haptic alert device. In one exemplary embodiment, the haptic alert assembly 140 is implemented as part of the vehicle seat assembly 200, as will now be described in greater detail.

Figure 2:
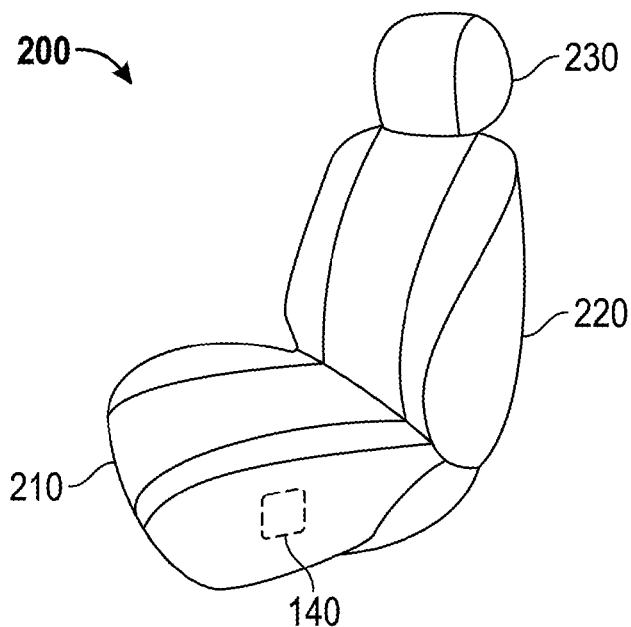
FIG. 2 is a schematic side positional view of a vehicle seat assembly of the vehicle of FIG. 1 in accordance with exemplary embodiments.

FIG. 2 is a schematic side view of a vehicle seat assembly 200 in accordance with an exemplary embodiment. The seat assembly 200 may be installed on a floor of the passenger area of a vehicle, such as the vehicle 10 described above. In one exemplary embodiment, the seat assembly 200 is a driver seat for an automobile, although in other exemplary embodiments, the seat assembly 200 may be a passenger seat and/or implemented into any type of vehicle.

As shown in FIG. 2, the seat assembly 200 includes a lower seat member 210, a seat back member 220, a head rest 230, and a haptic alert assembly 140, such as the haptic alert assembly 140 introduced above in the discussion of FIG. 1. The lower seat member 210 defines a generally horizontal surface for supporting an occupant (not shown). The seat back member 220 may be pivotally coupled to the lower seat member 210 and defines a generally vertical surface for supporting the back of an occupant. The head rest 230 is operatively coupled to the seat back member 220 to support the head of an occupant. Although not shown, the lower seat member 210, the seat back member 220, and the head rest 230 are each formed by a foam body mounted on a frame and covered with a cover.

As described in greater detail below, the haptic alert assembly 140 is installed in the lower seat member 210 to provide haptic signals (e.g., vibrations) to the occupant in predetermined situations. As noted above, the haptic alert assembly 140 is part of the driver alert system 100 to alert the driver and/or automatically control (e.g., brake, or steer) the vehicle to either help the driver avoid the crash or reduce the crash impact speed.

Figure 3:
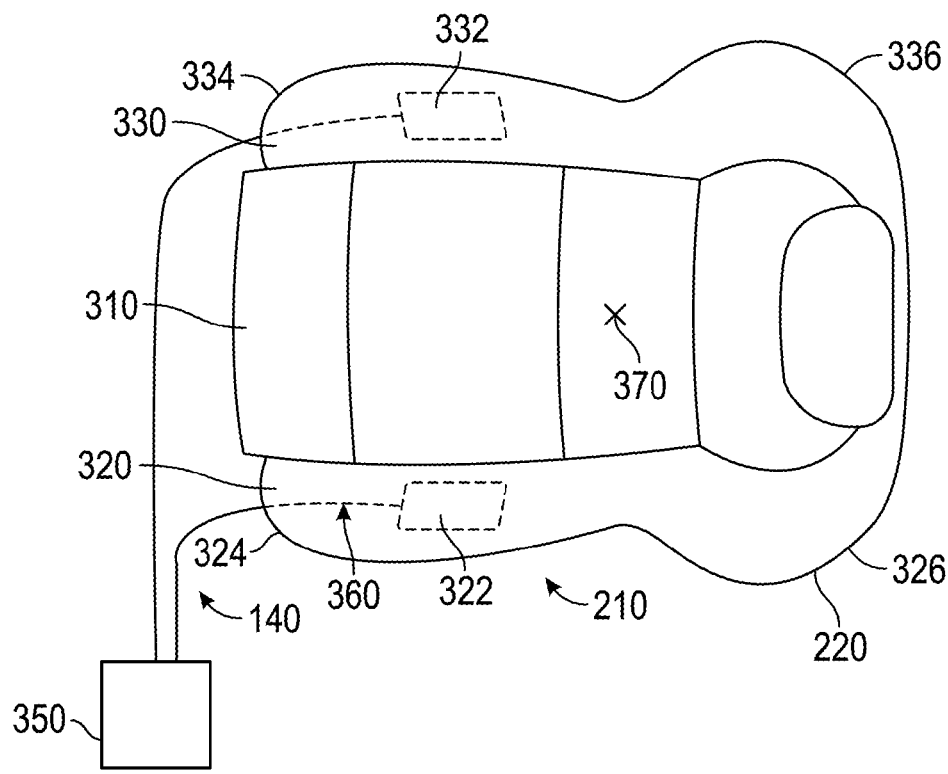
FIG. 3 is a partial top positional view of the seat assembly of FIG. 2 in accordance with exemplary embodiments.

FIG. 3 is a top view of the seat assembly 200 of FIG. 2 in accordance with an exemplary embodiment. As shown in FIG. 3, the lower seat member 210 generally includes a seat pan 310, a first bolster 320, and a second bolster 330. The bolsters 320, 330 are generally considered the left outermost and right outermost side of the lower seat member 210, respectively. As can be appreciated, in various other embodiments, the seat pan 310 can be without bolsters 320, 330, such as a flat seat. In FIG. 3, the bolsters 320, 330 are arranged on the longitudinal sides of the seat pan 310 (e.g., the left and right sides) to support the legs and thighs of the occupants. Each of the bolsters 320, 330 may be considered to have a front end 324, 334 and a back end 326, 336 relative to the primary direction of forward travel. As shown, the seat back member 220 may overlap a portion of the bolsters 320, 330 at the back ends 326, 336. As is generally recognized in seat design, the bolsters 320, 330 are arranged on the sides of the lower seat member 210, typically at an angle to the seat pan 310.

FIG. 3 additionally illustrates positional aspects of the haptic alert assembly 140. In particular, the haptic alert assembly 140 includes a first actuator 322 installed in the first bolster 320 and a second actuator 332 installed in the second bolster 330. The first and second actuators 322, 332 are coupled to a haptic controller 350 with a wiring harness 360. In one exemplary embodiment, the haptic controller 350 corresponds to the control module 130 discussed above, although the haptic controller 350 may alternatively be a separate controller. As can be appreciated, the controller 350 may be integrated with other control modules or may be implemented separately for each collision avoidance system. The controller may also be a plug-in device that is installed into the onboard diagnostics connector of the vehicle (OBD-II), a retrofit module that is collocated with an existing vehicle module (i.e., installed at the host module using an adaptation connector), or as a replacement part for an existing vehicle system (i.e., inside rear-view mirror assembly). The controller may also be a wireless device that is communicatively coupled to the vehicle over a short range wireless connection such as Wi-Fi, Bluetooth, NFC or similar.

In general, the first and second actuators 322, 332 are positioned to enable the occupant to clearly and quickly perceive and differentiate various types of haptic signals without negatively impacting seat comfort and seat durability. The particular locations of the first and second actuators 322, 332 may additionally depend on seat design considerations, including seat structure, bolster design, and foam thickness. Although the first and second actuators 322, 332 are described as being positioned in the bolsters 320, 330, in other embodiments, the first and second actuators 322, 332 may be positioned in other areas of the seat assembly 200, such as the seat pan 310, seat back member 220, and/or the head rest 230.

As shown, first and second actuators 322, 332 (e.g., two actuators) are provided to independently generate the desired haptic signals to the occupant either on the left side, right side, or both the left and right sides. However, in other embodiments, additional actuators may be provided. In one exemplary embodiment, installation of the first and second actuators 322, 332 in the first and second bolsters 320, 330 functions to isolate the actuators' vibration from one another such that the actuators 322, 332 tactile vibrations are decoupled (or isolated) from one another. As such, the vibrations may be highly localized. Consequently, when it is desired to generate only one of these two actuators (e.g., the left actuator), the seat occupant does not experience unintended vibrations that can travel through the seat cushion material or seat structure to the other actuator location (e.g., the right actuator). As one example, the peak amplitude of measured vertical acceleration at the activated actuator location normal to the seat bolster surface may be at least seven times greater than the peak amplitude of the measured acceleration along the axis parallel to the axis of rotation of the motor actuation.

In one exemplary embodiment, the first and second actuators 322, 332 are positioned about two-thirds of the distance between the front ends 324, 334 of the bolsters 320, 330 and the seat back member 220. In one exemplary embodiment, the first and second actuators 322, 332 (e.g., the forward edge of the actuators 322, 332) may be laterally aligned with the H-point (or hip-point) 370, as schematically shown. In other embodiments, the actuators 322, 332 (e.g., the rear edge of the actuators 322, 332) are positioned approximately 25 cm forward of the H-point 370 and/or between 0 cm and 25 cm forward of the H-point 370. As generally recognized in vehicle design, the H-point 370 is the theoretical, relative location of an occupant's hip, specifically the pivot point between the torso and upper leg portions of the body. In general and as discussed above, the actuators 322, 332 are positioned with consideration for performance, seat durability, and seat comfort. However, the exemplary positions discussed herein enable advantageous occupant reaction times from the perspectives of both recognition and interpretation (e.g., feeling the vibration and recognizing the alert direction), typically on the order of hundreds of milliseconds. In one exemplary embodiment, the location of the H-point 370 is unchanged as compared to a lower seat member without a haptic feedback assembly.

As described below, the two actuators 322, 332 provide advantages with respect to the occupant detection and interpretation of alert (e.g., the direction of the crash threat), seat comfort, and seat durability. In one exemplary embodiment, the actuators 322, 332 may individually generate first and second portions of a haptic alert, respectively, or be individually operated to generate the entire response. As an example, the two actuators 322, 332 provide a clear signal regarding the nature of the alert and direction the alert is referring to, e.g., rapid pulsing of the left actuator 322 signals to the driver they have drifted across a left lane marking without their left turn signal activated, similar to a rumble strip warning. Additional actuators, such as also activating the right actuator in this case of a left lane departure, will reduce the chance the occupant will correctly associate the activation with a left side event and it will increase the time it takes for the occupant to determine a left side event has occurred (e.g., if the actuation occurs when the driver is looking away from the road ahead). Similarly, the position and size of the actuators 322, 332 provide advantages with respect to seat durability, which can be measured by commonly used sliding entry, jounce and squirm, and knee load durability seat validation tests. The actuators 322, 332 may be designed to function for 100,000 actuation sequences over 150,000 miles of vehicle life. Other positions may compromise occupant detection and alert effectiveness, seat comfort, and seat durability. For example, if the haptic device is placed at the very front edge of the seat, the occupant may not perceive seat vibrations if they pull their legs back against the front portions of the seat.

Figure 4:
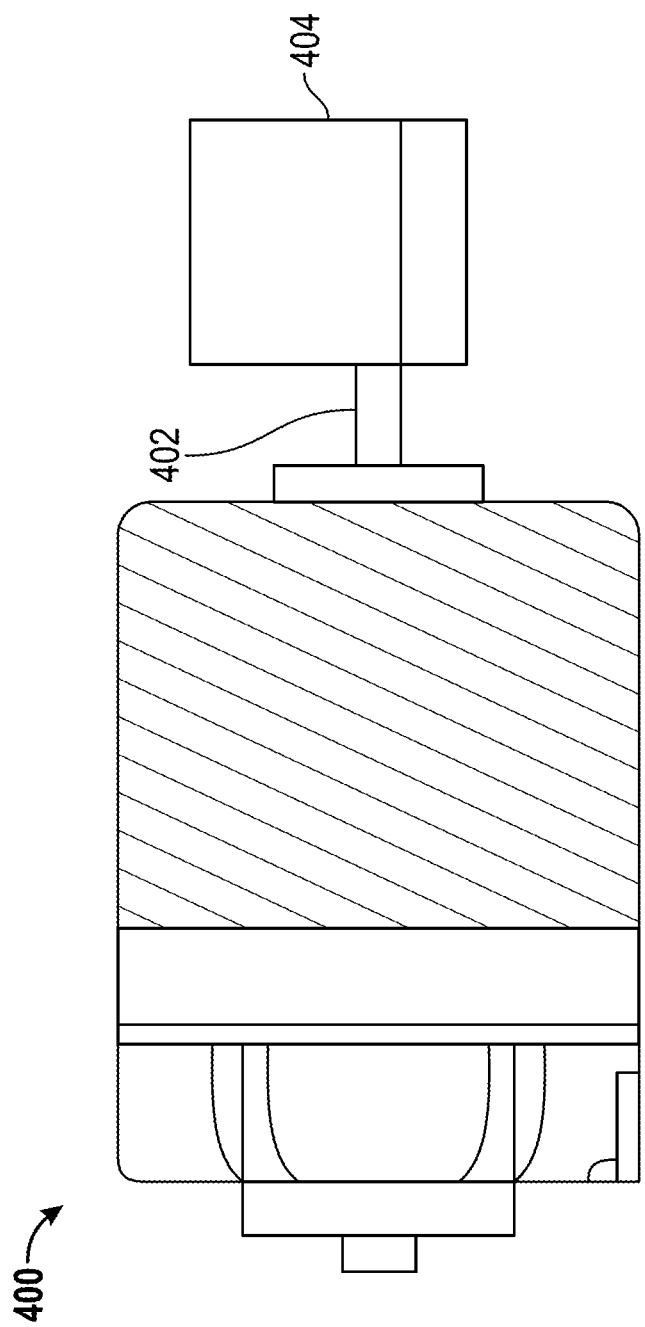
FIG. 4 is a side positional view of a motor incorporated into the seat assembly of FIG. 3 in accordance with exemplary embodiments.

FIG. 4 is a side view of a motor 400 that may be incorporated into the actuators 322, 332 described above. As an example, one motor 400 may be incorporated into each actuator 322, 332. The motor 400 may be a relatively small and light motor, for example, a 12 VDC motor in which an electric current drives magnets or coils to rotate an output shaft 402. An eccentric mass 404 is coupled to and rotates with the shaft 402 to produce a haptic response. In other words, the eccentric mass 404 is selectively rotated to produce a vibrating sensation for an occupant. The motor 400 and/or shaft 402 may be sized and shaped to produce the desired characteristics of the haptic response. Other types of motors and/or actuation assemblies may be provided, including smart materials.

As noted above, the haptic controller 350 may have various predetermined patterns implemented with active and inactive periods of operation. During the active period, the haptic controller 350 commands the selected motor 400 (e.g., the motor in actuator 322 or the motor 400 in actuator 332) to rotate, and during the inactive period, the haptic controller 350 does not commands the selected motor 400 to rotate.

The motor 400 may be operated in a manner to create haptic pulses at the surface of the seat bolster (e.g., bolster 320, 330) varied in length, spacing, and intensity to create the haptic feedback felt by the driver of the vehicle. The haptic feedback created by the haptic pulses, in conjunction with the location of the vibration pulses, indicates the type of alert, e.g., the nature of the collision condition. The haptic controller 350 determines the appropriate voltage and determines, for example, a pulse width modulation (PWM) pattern of "on" periods where voltage is provided to the motor 400 and "off" periods where no voltage is provided to the motor 400.

Figure 5:
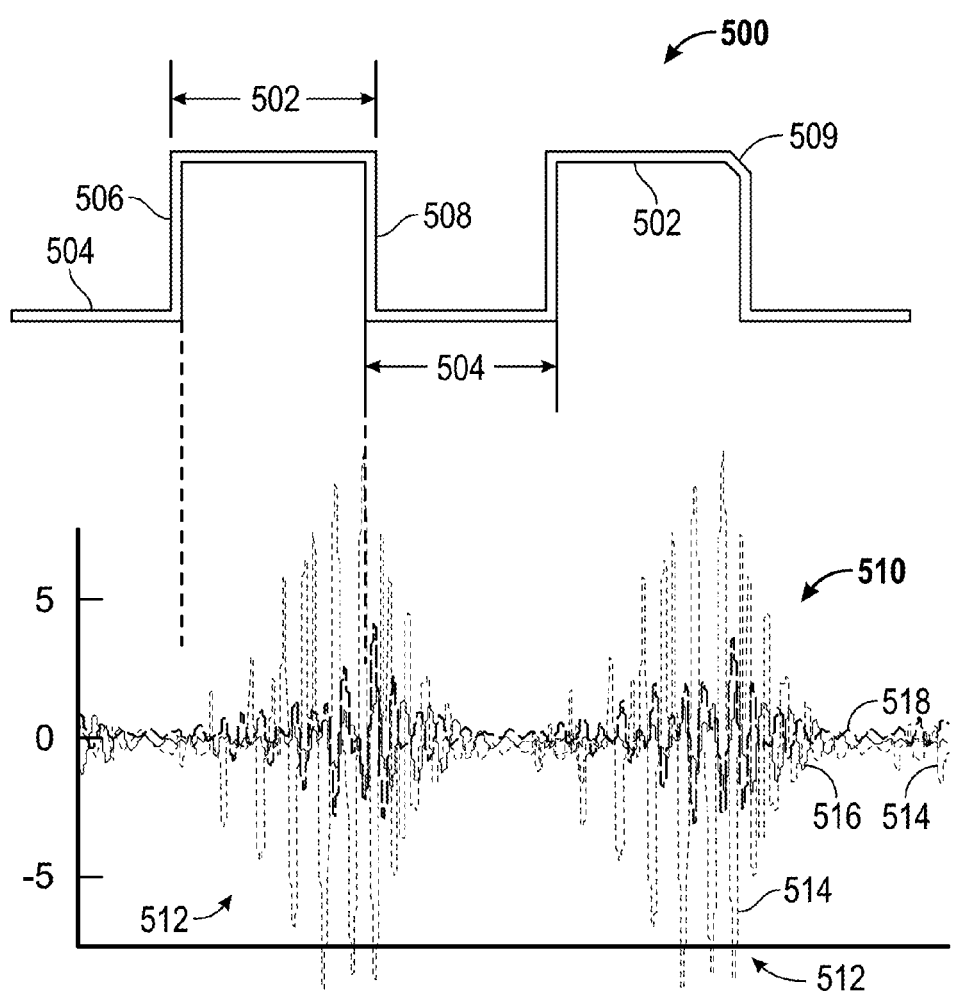
FIG. 5 is a graphical view of an actuation profile and an acceleration profile in accordance with exemplary embodiments.

Referring now to FIG. 5, examples of an actuation profile 500 and an acceleration profile 510 are illustrated in accordance with some embodiments. The actuation profile 500 represents the commanded actuation signal sent to the motors to determine the intensity and duration of haptic feedback felt by the driver. For example, the actuation profile may represent the average signal generated by the haptic controller 350 to command the actuators 322, 332. The actuation profile 500 includes an active period 502 and an inactive period 504. For example, the active period 502 may be defined by a positive voltage signal generated by the haptic controller 350 and the inactive period 504 may correspond to a low or zero voltage signal generated by the haptic controller 350. Each active period 502 has a leading edge 506 and a trailing edge 508. In some embodiments, the leading edge 506 and/or the trailing edge 508 may include a taper 509 to adjust the acceleration profile of the haptic pulse, as will be described below. During the active period 502, the haptic actuator is commanding the selected motors to rotate. During the inactive period 504, the haptic actuator is not commanding the selected motors to rotate. It should be appreciated that the active period 502 is a representation of the average signal applied to the motors, and in fact may include rapidly repeating PWM sequences.

The acceleration profile 510 indicates the acceleration at the surface of the seat bolster. For example, the acceleration profile 510 may be measured with an accelerometer placed at the surface of the first bolster 320 to measure acceleration due to actuation of the actuator 322. The acceleration profile 510 illustrates haptic pulses 512 that are varied in length and spacing to create the haptic feedback felt by the driver of the vehicle. The haptic feedback created by the haptic pulses 512 indicates the type of alert. The acceleration profile 510 includes first direction data 514, second direction data 516, and third direction data 518. In the embodiment illustrated, the first direction data 514 corresponds to acceleration measured normal to the seat bolster surface, the second direction data 516 corresponds to acceleration measured at the surface of the bolster in a fore-aft direction with respect to the motor, and the third direction data 518 corresponds to acceleration measured at the surface of the bolster in a lateral direction perpendicular to the vertical and fore-aft directions.

In one exemplary embodiment, the peak amplitude of measured vertical acceleration at the activated actuator location normal to the seat bolster surface is at least five times greater than the peak amplitude of the measured acceleration in the vertical, fore-aft, and lateral directions at non-activated actuator locations. Moreover, by way of example, the actuation profile may be adjusted to create a desired acceleration profile felt by variously sized drivers. For example, a high frequency component of the vibration corresponding to the rotational speed of the motor 400 may be within the range of 55 to 67 Hz. The high frequency component is also selected to reduce undesirable interactions with road vibration frequencies. The vertical acceleration of the vibration may be between 50 and 72 m/s2. In one example, the vertical acceleration level is within 10% across each of the actuator locations.

In general, the acceleration profile 510 at the seat bolster increases during the active period 502 of the actuation profile 500 and decreases during the inactive period 504 of the actuation profile 500. The relative duration of the active period 502 and inactive period 504 of the actuation profile 500 may be used to indicate the severity of the potential hazard. Additionally, the time between active periods 502 and inactive periods 504 may be decreased to indicate more urgent alerts. For example, unique haptic alert actuation profiles 500 may be used to distinguish between near-field imminent crash alerts and far-field advisory events that may occur beyond the driver's line of sight.

Figure 6:
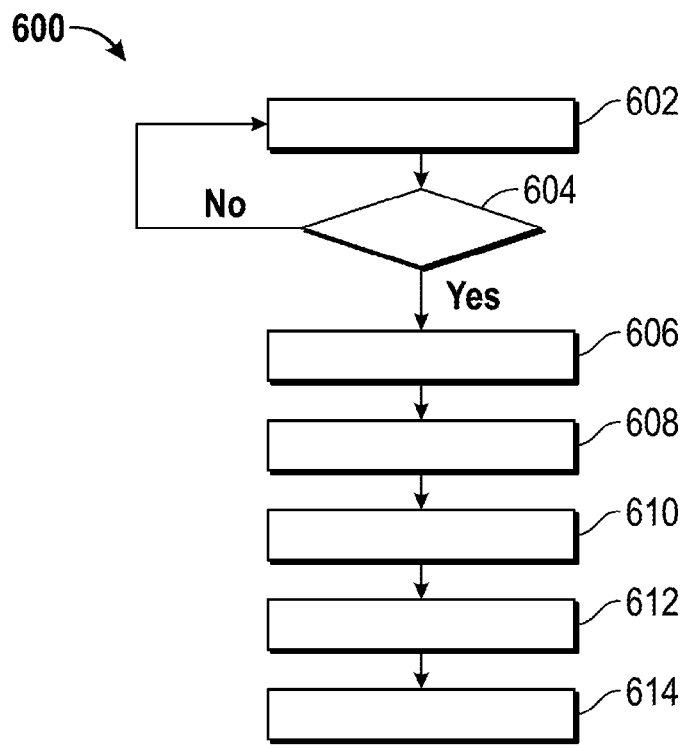
FIGS. 6-8 are flowcharts illustrating alert methods that may be performed by the alert systems in accordance with exemplary embodiments.

Referring now to FIG. 6, a flowchart for a method 600 of controlling a haptic system is illustrated in accordance with some embodiments. In general, the method 600 establishes mapping of system alerts to vibration motors, establishes a number of vibration pulses to command, and establishes on/off cycle repeating patterns of pulses. In the example provided, the operations of the method 600 are performed by the haptic controller 350. As can be appreciated in light of the disclosure, the order of operation within the method is not limited to the sequential execution as illustrated in FIG. 6, but may be performed in one or more varying orders as applicable and in accordance with the present disclosure. In various embodiments, the method can be scheduled to run based on predetermined events, and/or can run continually during operation of the vehicle.

In a first operation 602, a controller evaluates conditions related to the vehicle. The conditions may include conditions of the environment surrounding and within the vehicle. For example, the haptic controller 350 may evaluate data from the sensors (e.g., camera, radar, and/or lidar) of the collision avoidance modules 110.

The haptic controller 350 determines whether to command a haptic alert based on the conditions. For example, the haptic controller 350 may determine whether the conditions indicate a potential collision (e.g., in tight spaces when parking, high speed collision with an approaching vehicle while driving, etc.). If the controller 350 determines not to command a haptic alert, then the controller returns to operation 602 to continue evaluating the conditions. If the control module determines to command the haptic alert, then the controller performs operation 606.

In operation 606, the controller determines what type of haptic alert to command based on the conditions evaluated in operation 602. For example, the haptic alert may indicate a Lane Departure Warning, a Lane keeping Assist, a Rear Cross Traffic Alert, a Forward Collision Alert, a Collision Imminent Braking, an Adaptive Cruise Control event, a Rear Park Assist, a Back-Up Warning, a Front Pedestrian Detection, a Rear Pedestrian Detection event, or other types of events.

The controller determines a pattern of which haptic actuators to command in operation 608 based on the type of haptic alert and the location of the haptic actuators. For example, the controller 350 may command the first actuator 322, the second actuator 332, or both actuators based on the type of haptic alert indicated. In one example, the second actuator 332 positioned near the driver's right leg is selected for actuation when an object is detected approaching from the right side of the vehicle 10 while the driver is backing up. Conversely, when an object is detected approaching from the left side of the vehicle 10 while the driver is backing up, the first actuator 322 positioned near the driver's left leg is selected for actuation.

The actuators are similarly selected for right and left lane departure warnings, or other potential hazards detected to the sides of the vehicle.

When a potential hazard is detected to the front or rear of the vehicle, the haptic controller 350 may select the actuators 322, 332 located on both sides of the driver. Motor selection patterns may be used to indicate various alerts. For example, where multiple motors are located in a particular region, the motors may be selected simultaneously or may be alternated in any pattern. For example, the motors may be alternately actuated to create zigzag or circular patterns.

In operation 610, the controller selects the number of active haptic periods to command based on the type of haptic alert. As indicated above, the active periods correspond to haptic pulses transmitted to the driver through the seat. Fewer active periods and pulses may indicate a less severe alert, while greater numbers of active periods and pulses may indicate a more severe alert. For example, five pulses may indicate an imminent crash alert to a vehicle directly head, whereas two pulses may indicate a far-field forward traffic event (e.g., traffic jam ahead).

In operation 612, the controller selects the duration of the active haptic periods and inactive haptic periods based on the type of haptic alert. By selecting the durations, the length and time between pulses may be adjusted. For example, a park assist application may use separation time between pulses or the number of pulses to indicate proximity of the vehicle to objects. Separation between pulses may be increased by increasing the duration of the inactive periods. When an object is first detected, one pulse, two pulses, or a unique pulse signature may be provided. As the vehicle moves closer to the object, the separation time between pulses (or pulse signatures) is decreased until a minimum separation time is reached and/or the number of pulses can be increased (e.g., five pulses can be triggered). The intensity settings for the proximity alerts may be distinct from the crash alert settings to reduce customer discomfort or annoyance.

In another example, alert cadence between systems may be quickly toggled to indicate a multiple scenario event. For example, if there is a forward event that is concurrent with a side event, the time between active periods 502 and inactive periods 504 of the actuation profile 500 may be decreased to indicate the multiple alert states. For example, instead of alternating forward-side-forward-side alerts at 100 ms intervals, the alerts may be alternated at 50 ms. Alternatively, the active period 502 associated with a higher priority event, as determined by the safety system, may be commanded more often. For example, if the forward alert is deemed to be more serious, the seat will generate a pattern such as forward-forward-side-forward-forward-side. The pattern may be based on the individual system alert or may be customized in the context of a multiple alert scenario.

Examples of lengths of active and inactive periods of alert patterns are provided below. A haptic alert for a Lane Departure Warning (LDW) event may be indicated by three pulses commanded with active periods of 80 ms and inactive periods of 120 ms. A Rear Cross Traffic Alert (RCTA) event may be indicated by three pulses commanded with active periods of 100 ms and inactive periods of 100 ms. A Forward Collision Alert (FCA), Collision Imminent Braking (CIB), or Adaptive Cruise Control (ACC) event may be indicated by five pulses commanded with active periods of 100 ms and inactive periods of 100 ms. A Rear Park Assist (RPA) first detect event may be indicated by one or two pulses commanded with active periods of 70 ms and inactive periods of 130 ms. A RPA and Front Park Assist (FPA) near object event may be indicated by five pulses commanded with active periods of 70 ms and inactive periods of 130 ms. An ACC "go notifier" event (to signal to the driver using ACC, after the vehicle has come to a stop, that the vehicle they are following has proceeded to move forward) may be indicated by three pulses commanded with active periods of 100 ms and inactive periods of 100 ms. It should be appreciated that other relative and absolute time periods may be incorporated without departing from the scope of the present disclosure.

In various embodiments, the alert mode can indicate multiple alert modes at any one time (e.g., a Forward Collision Warning and Lane Departure Warning may occur in close time proximity). In such a case, the determined alert patterns for one or more of the various alert modes can be arbitrated to determine a preferred pattern, can be combined or added to create unique, superimposed, and/or summative patterns without the need for arbitration, and/or can be presented simultaneously without the need for arbitration. In this latter case where arbitration is not needed, if another alert (e.g., Forward Collision Warning) is requested while an alert is being executed (e.g., Lane Departure Warning), for example, a seat vibration alert can generate the required pattern (or waveform) for each required actuator, and then sum the new pattern with the remaining time of the currently executing pattern, and execute the result for each required actuator. Active time and inactive time for each actuator would be affected by the summation process, however the vibratory intensity during active time could be maintained (or increased if desired) if more than one alert is requesting active time for that moment.

In operation 614 the controller generates a signal to command the selected pattern of haptic actuators, the selected number of active haptic periods, and the duration of active and inactive haptic periods. For example, the controller 350 may generate the signal to command the actuators 322, 332 to provide the haptic pulses 512.

Figure 7:
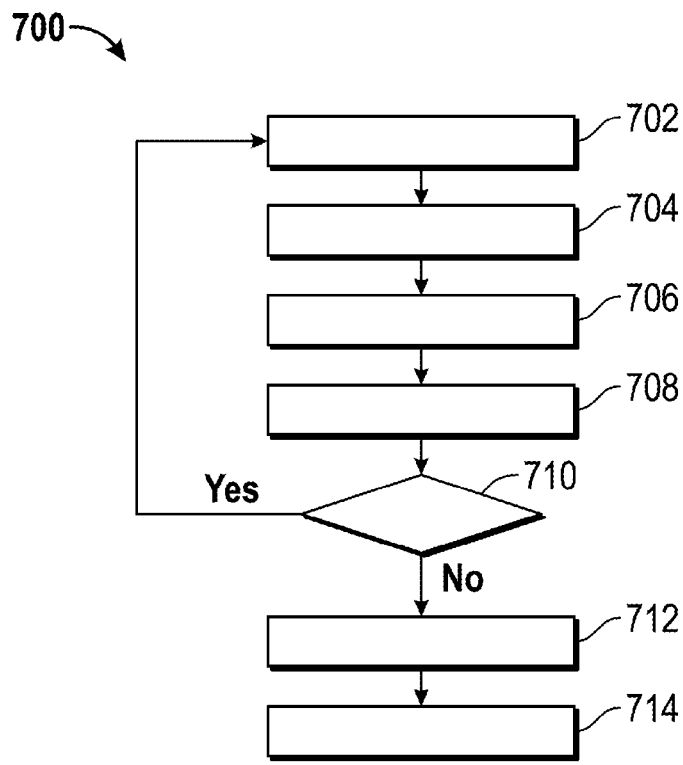

Referring now to FIG. 7, a flowchart for a method 700 of controlling a haptic system is illustrated in accordance with some embodiments. For example, the controller 350 may generate a signal with active periods 502 to command the actuators 322, 332 to create the pulses 514. In general, the method 700 establishes a constant vibration feel using pulse width modulation (PWM) control of haptic actuators based on an actual battery voltage provided to a controller.

In operation 702, the controller selects a pattern of active haptic periods during which the controller will command haptic pulses from haptic actuators. For example, the controller 350 may select a pattern of active haptic periods 502 by performing the operations of the method 600 described above.

In operation 704 the controller determines the desired intensity of the haptic pulses. For example, the controller 350 may determine the intensity by retrieving the desired intensity from a lookup table. In one example, the controller 350 may determine that the haptic pulses 512 will be closely spaced with unique intensity values (e.g., "BUZZ-buzz" or "buzz-BUZZ," where capitals indicate unique intensity values) to create unique pulse signatures.

The controller determines the desired voltage of a signal to be generated during the active haptic periods to achieve the desired intensity of the haptic pulses in operation 706. For example, the desired voltage to apply to the motor 400 may be determined based on the directly proportional relationship between the rotational speed of the direct current motor 400 and the voltage applied to the motor 400. In one example, the controller 350 retrieves the desired intensity from a lookup table and omits operation 704.

In operation 708, the controller determines the actual battery voltage supplied to the controller. The actual battery voltage supplied in vehicles may vary within and between ignition cycles. In one example, the controller 350 measures the actual voltage supplied to the controller 350 by the battery 12. The controller determines whether the actual voltage is within thresholds in operation 710. The thresholds indicate a range of voltages near the desired voltage in which the controller will not modify the active periods. For example, when the desired voltage is 11 volts and the actual supplied battery voltage is 11.1 volts, the controller 350 may determine not to modify the active periods.

When the actual battery voltage is not within the thresholds, the controller calculates a pulse width modulation (PWM) pattern that simulates the desired voltage in operation 712. In general, a PWM pattern is a rapid sequence of "on" periods where voltage is provided to the motor and "off" periods where no voltage is provided to the motor.

In operation 714, the controller generates a signal for the active haptic periods based on the calculated PWM pattern. For example, the PWM pattern may be commanded to the motor 400 during the active period 502 of the actuation profile 500 to control the power delivered to the motor. Because a DC motor speed is proportional to voltage, the PWM pattern creates consistent vibration intensity by simulating the desired voltage. For example, when the battery voltage is higher than desired, the proportion of "on" periods in the PWM pattern may be reduced. Additionally, the PWM pattern may be adjusted to create different intensities of vibration. For example, to produce a vibration with a higher intensity, the proportion of "on" periods in the PWM pattern may be increased.

Figure 8:
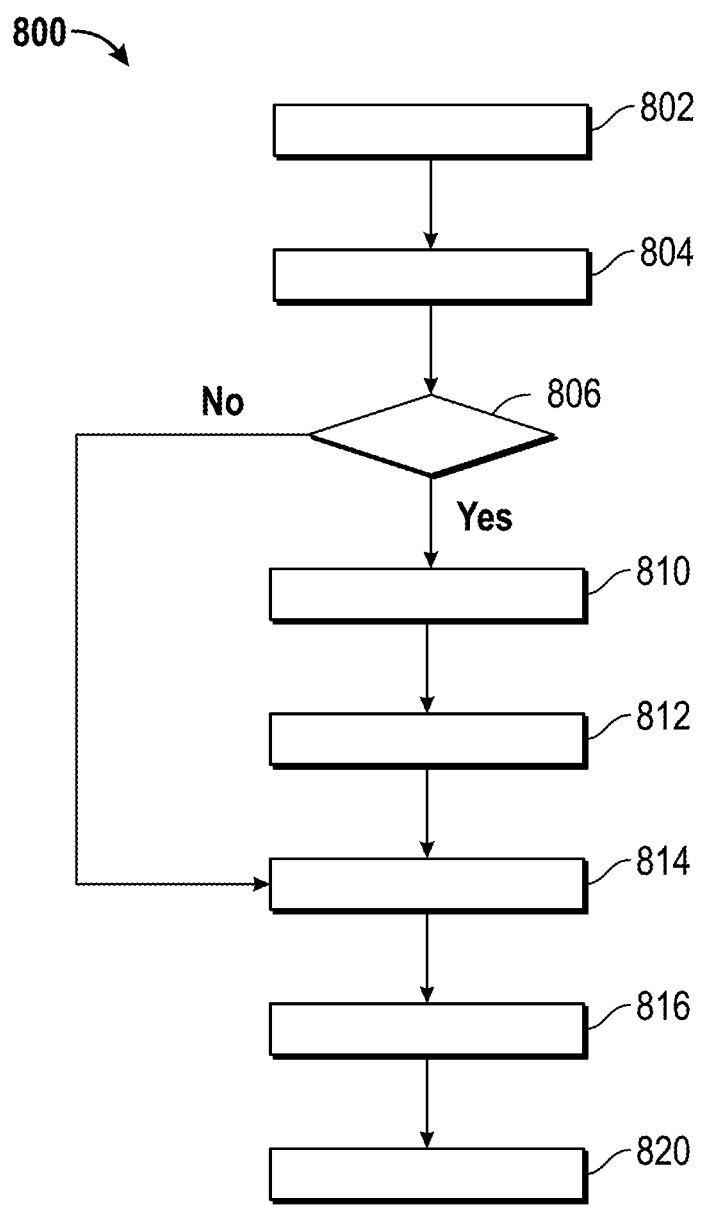

Referring now to FIG. 8, a flowchart for a method 800 of controlling a haptic system is illustrated in accordance with some embodiments. For example, the controller 350 may generate a signal with active periods 502 to command the actuators 322, 332 to create the pulses 512. In general, the method 800 establishes desirable vibration characteristics for a wide range of users so that adjustment control may be eliminated or reduced. Furthermore, the method 800 may be utilized to achieve desirable high frequency motor characteristics, as will be discussed below.

In operation 802, the controller determines a standard vibration intensity of haptic pulses based on a type of haptic alert. For example, the controller 350 may use a table lookup to determine the standard vibration intensity, or a continuous functional relationship. In one example, the standard vibration intensity is selected based on an "alerting and not yet annoying" detection level felt by users between the lowest fifth percentile of people by size and the largest fifth percentile of people by size.

The controller determines interior and exterior conditions of the vehicle in operation 804. The controller determines whether the vehicle conditions indicate that the vibration intensity is to be modified in operation 806. When the vibration intensity is to be modified, the controller calculates adjustments to the active periods 502 to achieve a modified vibration intensity. For example, the controller 350 may calculate a PWM pattern that will achieve the modified vibration intensity.

In one example, the interior vehicle conditions include sensed or predicted acoustics of the interior of the vehicle that may impact a driver's ability to sense the vibration. For example, the detection of a particular song or music being played on the radio may be used to adapt the alert pattern either by increasing the vibration intensity based on the presence of low frequency content or radio volume. Other interior conditions may include the output of a driver distraction module, drowsy driver module or enabled state of semi-autonomous driving systems (e.g., cruise control, adaptive cruise control, lane keeping or lane centering system).

The exterior vehicle conditions can include, but are not limited to, sensed or predicted acoustics or vibrations of the exterior of the vehicle that may impact the driver's ability to sense the vibration. For example, the detection of vehicle vibration as indicated by the vehicle suspension system can be used to adapt the alert pattern during rough road conditions. The pattern may be adjusted based on the nature or magnitude of the vibration from the suspension system. For example, if an average magnitude over a predetermined time is above a threshold, the alert pattern can be adjusted to increase the vibration intensity (e.g., by a discrete value, or a value that is determined based on the magnitude).

The controller determines desirable active period profiles in operation 812. For example, the leading edge 506 and trailing edge 508 of the active period 502 may be tapered by incorporating a varying PWM pattern to provide different haptic feedback profiles. For example, the PWM pattern may be adjusted to result in a haptic pulse 512 that has a linear or exponential increase in acceleration. Similarly, the end portion of the haptic pulse 512 may be varied by adjusting the PWM pattern. The rate of increasing acceleration in the haptic pulse 512 may be used to indicate the severity of the alert. For example, a rapidly increasing haptic pulse 512 intensity indicates an imminent, near-field alert and a slowly increasing haptic pulse 512 intensity indicates a far-field, less critical alert.

The controller determines desirable high frequency characteristics in operation 814. For example, the controller 350 may adjust the actuation profile 500, the PWM pattern, and the motor characteristics to create a desired acceleration profile felt by variously sized drivers. In one example, a high frequency component of the vibration corresponding to the rotational speed of the motor is within the range of 55 to 67 Hz. The high frequency component is also selected to reduce undesirable interactions with road vibration frequencies (e.g., masking of the actuation vibration).

In operation 816, the controller calculates adjustments to the active periods to achieve the desired high frequency characteristics and haptic pulse profile. For example, the controller 350 may adjust the PWM pattern or on/off compensation patterns during the active periods 502. In general, the on/off compensation patterns stop commanding actuation of the haptic actuators when the haptic actuators exceed an upper threshold rotational speed, and resume commanding actuation of the haptic actuators when the rotational speed of the haptic actuators is less than a lower threshold.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

The invention claimed is:
1. A method, comprising:
 selecting, with a controller, a pattern of active haptic periods during which the controller will command a plurality of haptic actuators disposed in a seat of a vehicle to generate haptic pulses;
 determining, with the controller, a desired voltage of a signal supplied to the haptic actuators that indicates the active haptic periods to generate a desired intensity of haptic pulses;
 measuring, with the controller, an actual voltage supplied to the controller by an energy storage device of the vehicle;
 calculating, with the controller, a pulse width modulation (PWM) pattern that simulates the desired voltage using the actual voltage; and
 generating, with the controller, a signal that indicates the active haptic periods based on the PWM pattern to command the haptic actuators to generate the desired intensity of haptic pulses.

2. The method of claim 1 further comprising modifying the PWM pattern applied during adjacent active periods to generate unique pulse signatures having unique intensity values for each of the haptic pulses of an alert sequence.

3. The method of claim 1 further comprising determining the desired intensity of haptic pulses based on a vibration intensity perceived by drivers larger than the smallest 5% of potential drivers and smaller than the largest 5% of potential drivers.

4. The method of claim 1 wherein determining the desired voltage includes determining the desired voltage based on a relationship between the rotational speed of a motor in the haptic actuator and a voltage applied to the motor.

5. The method of claim 1 further comprising determining whether the actual voltage is within a threshold range surrounding the desired voltage, and wherein calculating the PWM pattern includes calculating the PWM pattern in response to determining that the actual voltage is outside of the threshold range.

6. The method of claim 1 further including increasing a ratio of "on" portions to "off" portions in the PWM pattern to increase an actual intensity of the haptic pulses.

7. The method of claim 1 further including decreasing a ratio of "on" portions to "off" portions in the PWM pattern to decrease an actual intensity of the haptic pulses.

8. The method of claim 1 further including modifying the PWM pattern at a first portion of the active period to adjust an acceleration of the haptic intensity at a first portion of the haptic pulses.

9. A method, comprising:
 selecting, with a controller, a pattern of active haptic periods during which the controller will command a plurality of haptic actuators disposed in a seat of a vehicle to generate haptic pulses;
 determining, with the controller, a desired intensity of haptic pulses based on a vibration intensity perceived by drivers larger than the smallest 5% of potential drivers and smaller than the largest 5% of potential drivers;
 determining, with the controller, a desired voltage of a signal supplied to the haptic actuators that indicates the active haptic periods to achieve the desired intensity of haptic pulses;
 measuring, with the controller, an actual voltage supplied to the controller by an energy storage device of the vehicle;

calculating, with the controller, a pulse width modulation (PWM) pattern that simulates the desired voltage when applied to the signal using the actual voltage; and generating, with the controller, a signal that indicates the active haptic periods based on the PWM pattern to command the haptic actuators to generate the desired intensity of haptic pulses.

10. The method of claim 9 further comprising modifying the PWM pattern applied during adjacent active periods to generate unique pulse signatures having unique intensity values for each of the haptic pulses.

11. The method of claim 9 wherein determining the desired voltage includes determining the desired voltage based on a relationship between the rotational speed of a motor in the haptic actuator and a voltage applied to the motor.

12. The method of claim 9 further comprising determining whether the actual voltage is within a threshold range around the desired voltage, and wherein calculating the PWM pattern includes calculating the PWM pattern in response to determining that the actual voltage is outside of the threshold range.

13. The method of claim 9 further including increasing a ratio of "on" portions to "off" portions in the PWM pattern to increase an actual intensity of the haptic pulses.

14. The method of claim 9 further including decreasing a ratio of "on" portions to "off" portions in the PWM pattern to decrease an actual intensity of the haptic pulses.

15. A vehicle, comprising:
a seat for supporting a driver;
a plurality of haptic actuators disposed in the seat; and
a controller in communication with the plurality of haptic actuators and that:
selects a pattern of active haptic periods during which the controller will command the plurality of haptic actuators to generate haptic pulses;
determines a desired voltage of a signal to supply to the haptic actuators and that indicates the active haptic periods to achieve a desired intensity of haptic pulses;
measures an actual voltage supplied to the controller by an energy storage device of the vehicle;
calculates a pulse width modulation (PWM) pattern that simulates the desired voltage when applied to the actual voltage; and
generates the signal that indicates the active haptic periods based on the PWM pattern to command the haptic actuators to generate the desired intensity of haptic pulses.

16. The vehicle of claim 15 wherein the controller further modifies the PWM pattern applied during adjacent active periods to generate unique pulse signatures having unique intensity values for each of the haptic pulses.

17. The vehicle of claim 15 wherein the controller further determines the desired intensity of haptic pulses based on a vibration intensity perceived by drivers larger than the smallest 5% of potential drivers and smaller than the largest 5% of potential drivers.

18. The vehicle of claim 15 wherein the controller determines the desired voltage based on a relationship between the rotational speed of a motor in the haptic actuator and a voltage applied to the motor.

19. The method of claim 1 further comprising determining whether the actual voltage is within a threshold range around the desired voltage, and wherein calculating the PWM pattern includes calculating the PWM pattern in response to determining that the actual voltage is outside of the threshold range.

20. The method of claim 1 further including increasing a ratio of "on" portions to "off" portions in the PWM pattern to increase an actual intensity of the haptic pulses, and further including decreasing a ratio of "on" portions to "off" portions in the PWM pattern to decrease an actual intensity of the haptic pulses.

\* \* \* \* \*